E. R. BARANY.
MACHINE FOR SHAPING ARTICLES.
APPLICATION FILED JULY 23, 1920.

1,432,315. Patented Oct. 17, 1922.
12 SHEETS—SHEET 1.

Inventor
Edmund R. Barany

E. R. BARANY.
MACHINE FOR SHAPING ARTICLES.
APPLICATION FILED JULY 23, 1920.

1,432,315.

Patented Oct. 17, 1922.
12 SHEETS—SHEET 2.

Inventor
Edmund R. Barany
By his Attorney

E. R. BARANY.
MACHINE FOR SHAPING ARTICLES.
APPLICATION FILED JULY 23, 1920.
1,432,315.
Patented Oct. 17, 1922.
12 SHEETS—SHEET 3.
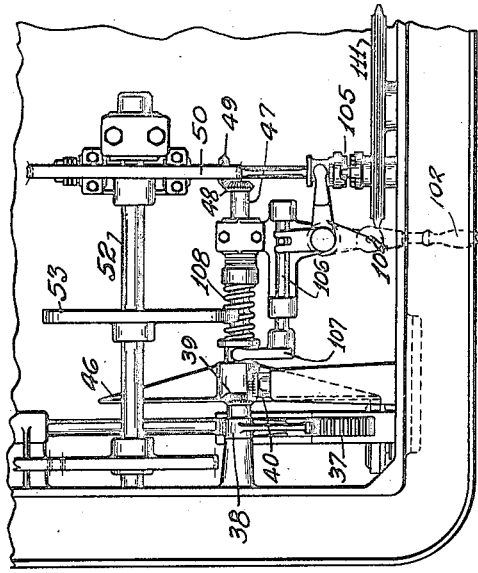
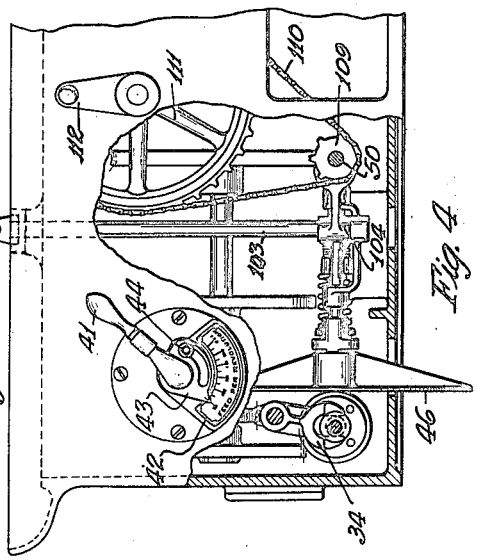
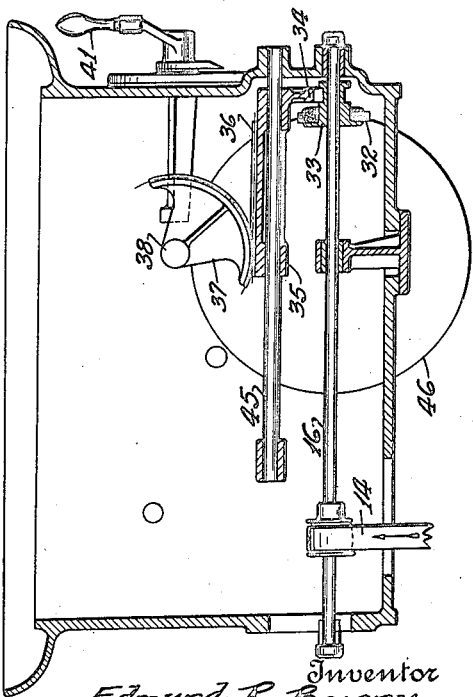
Inventor
Edmund R. Barany
By his Attorney Inventor
Edmund R. Barany
By his Attorney

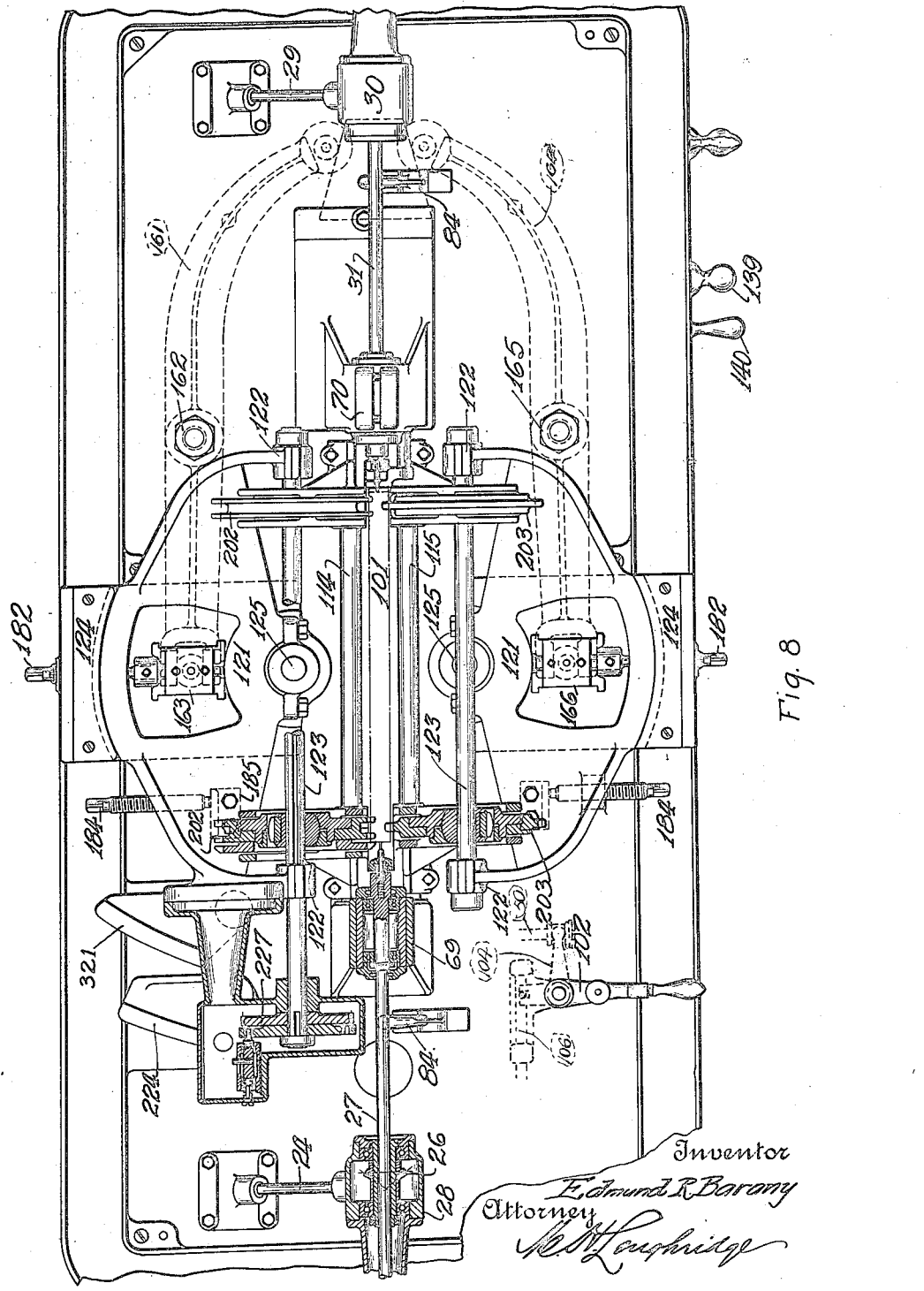

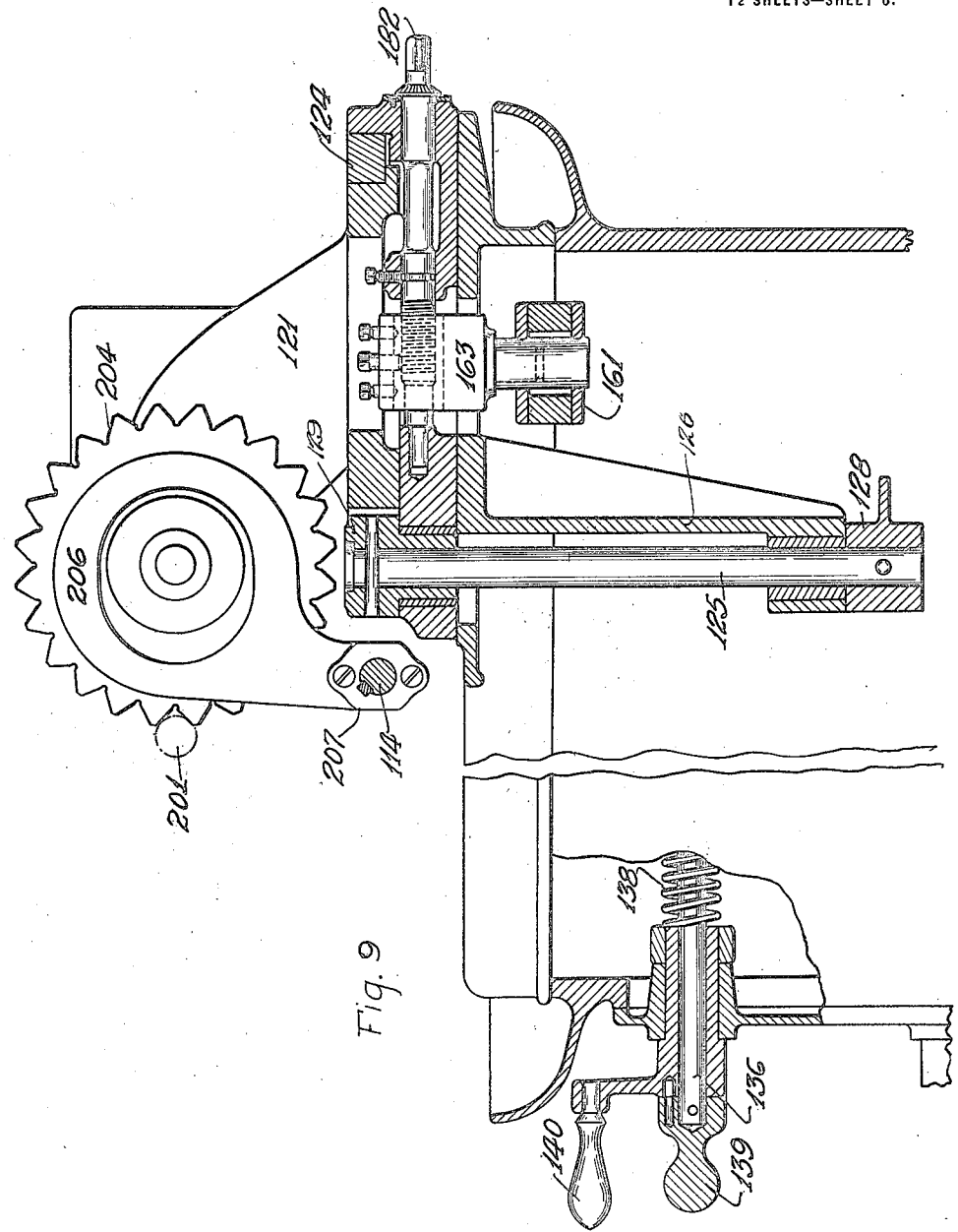

E. R. BARANY.
MACHINE FOR SHAPING ARTICLES.
APPLICATION FILED JULY 23, 1920.
1,432,315. Patented Oct. 17, 1922.
12 SHEETS—SHEET 9.
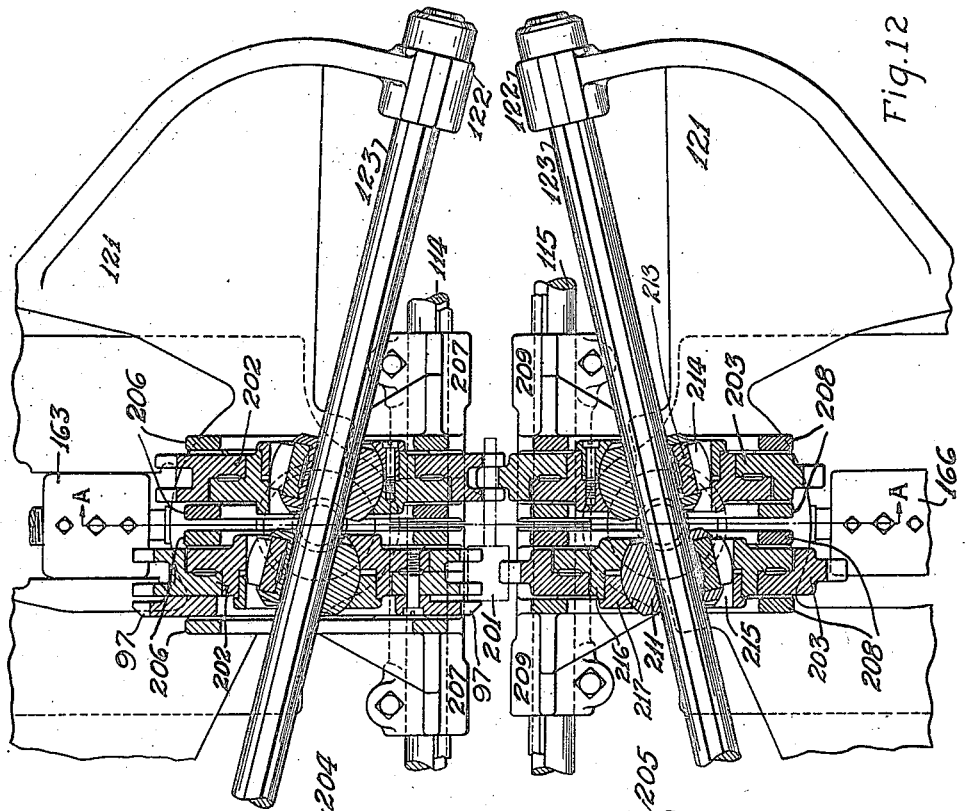
Fig.12
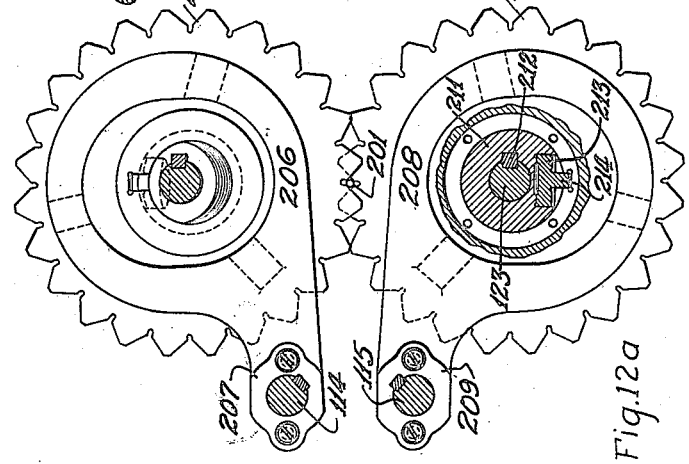
Fig.12a SECTION-A-A-
Inventor
Edmund R. Barany
By his Attorney

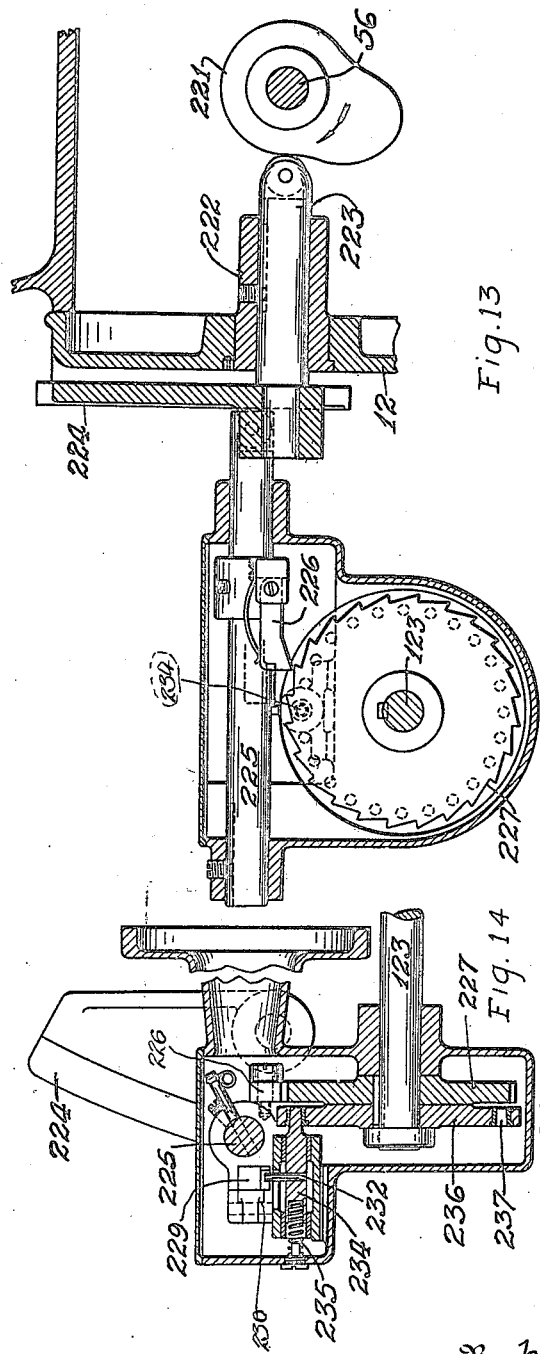

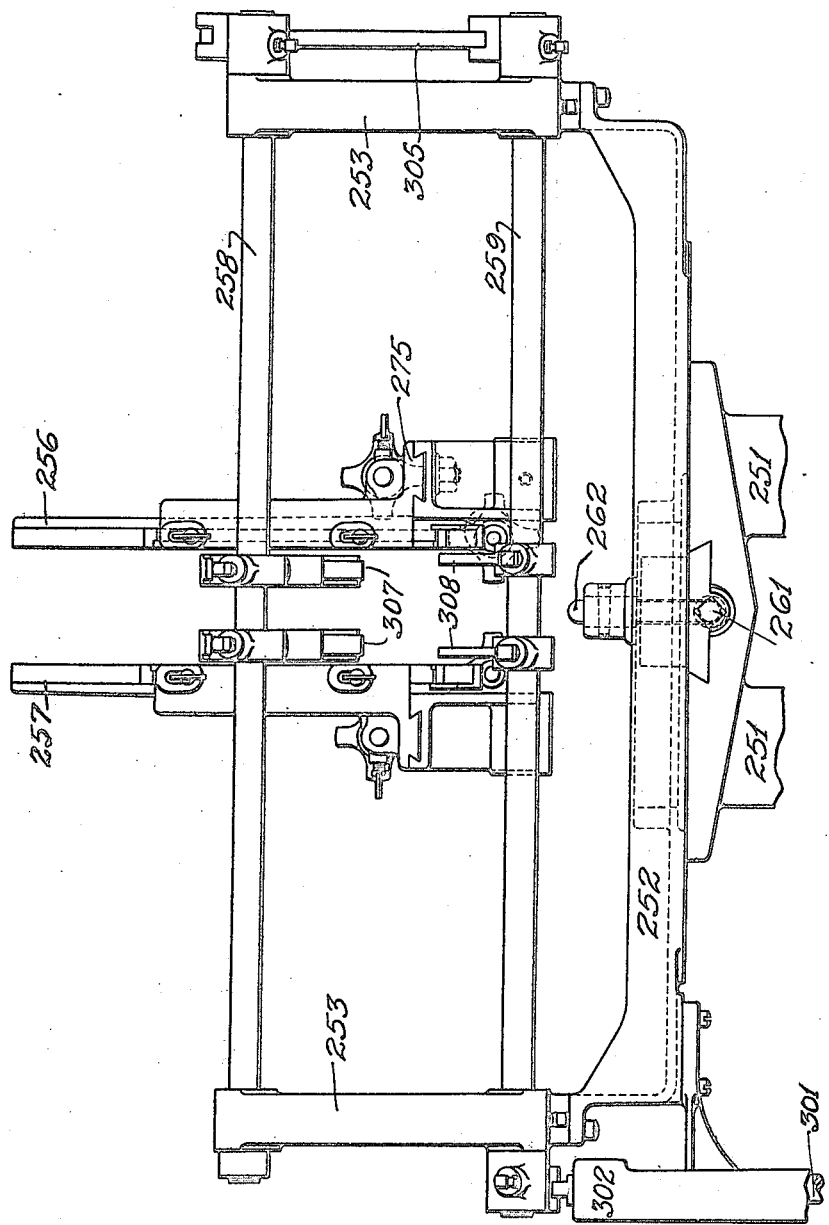

Inventor
Edmund R. Barany,
By his Attorney

Patented Oct. 17, 1922.

1,432,315

UNITED STATES PATENT OFFICE.

EDMUND R. BARANY, OF BROOKLYN, NEW YORK.

MACHINE FOR SHAPING ARTICLES.

Application filed July 23, 1920. Serial No. 398,424.

*To all whom it may concern:*

Be it known that I, EDMUND R. BARANY, a citizen of the United States, and a resident of 160 John Street, Brooklyn, in the county of Kings and State of New York, have invented certain new and useful Improvements in Machines for Shaping Articles, of which the following is a specification.

Figure 1:
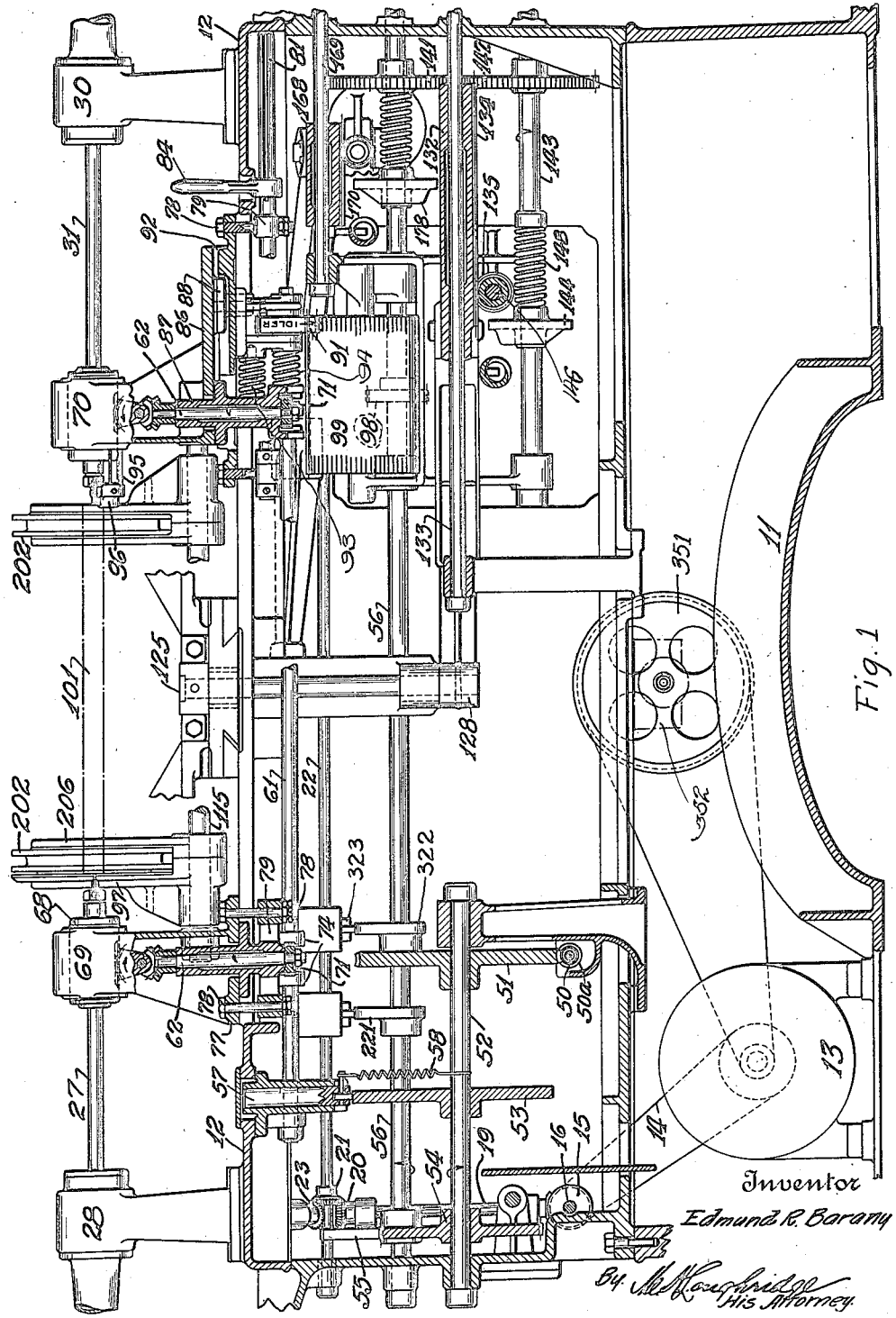
Figure 2:
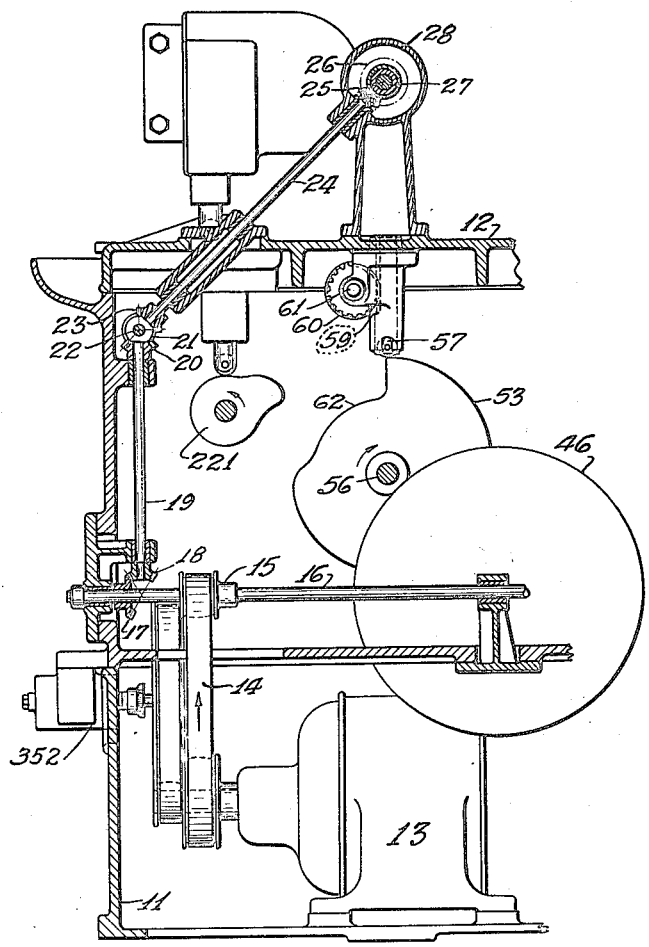
Figure 6:
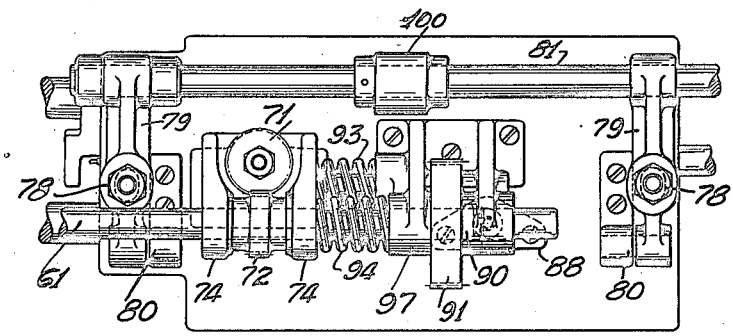
Figures 7, 7A:
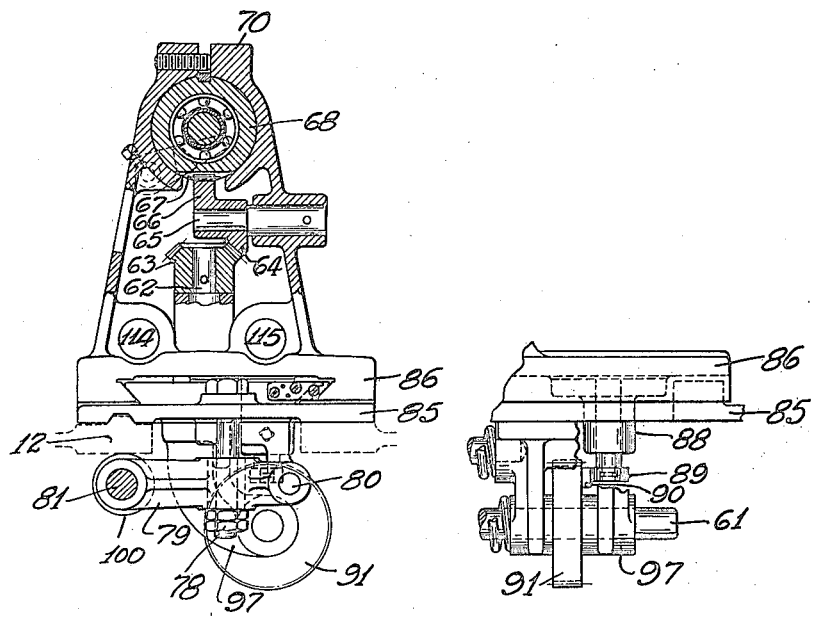
Figure 10:
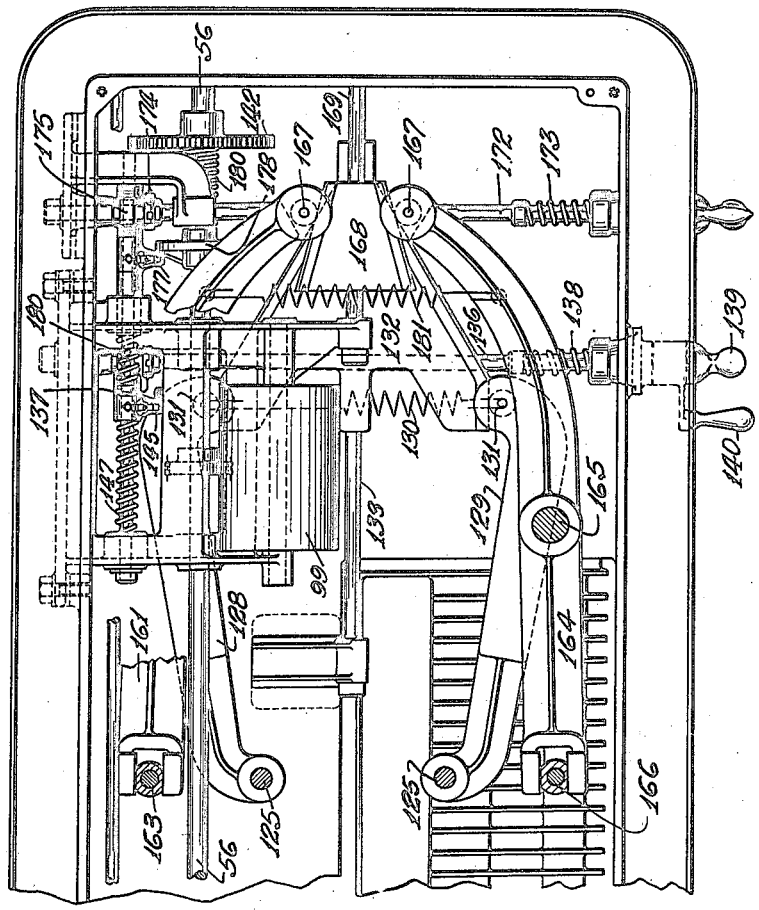
Figure 11:
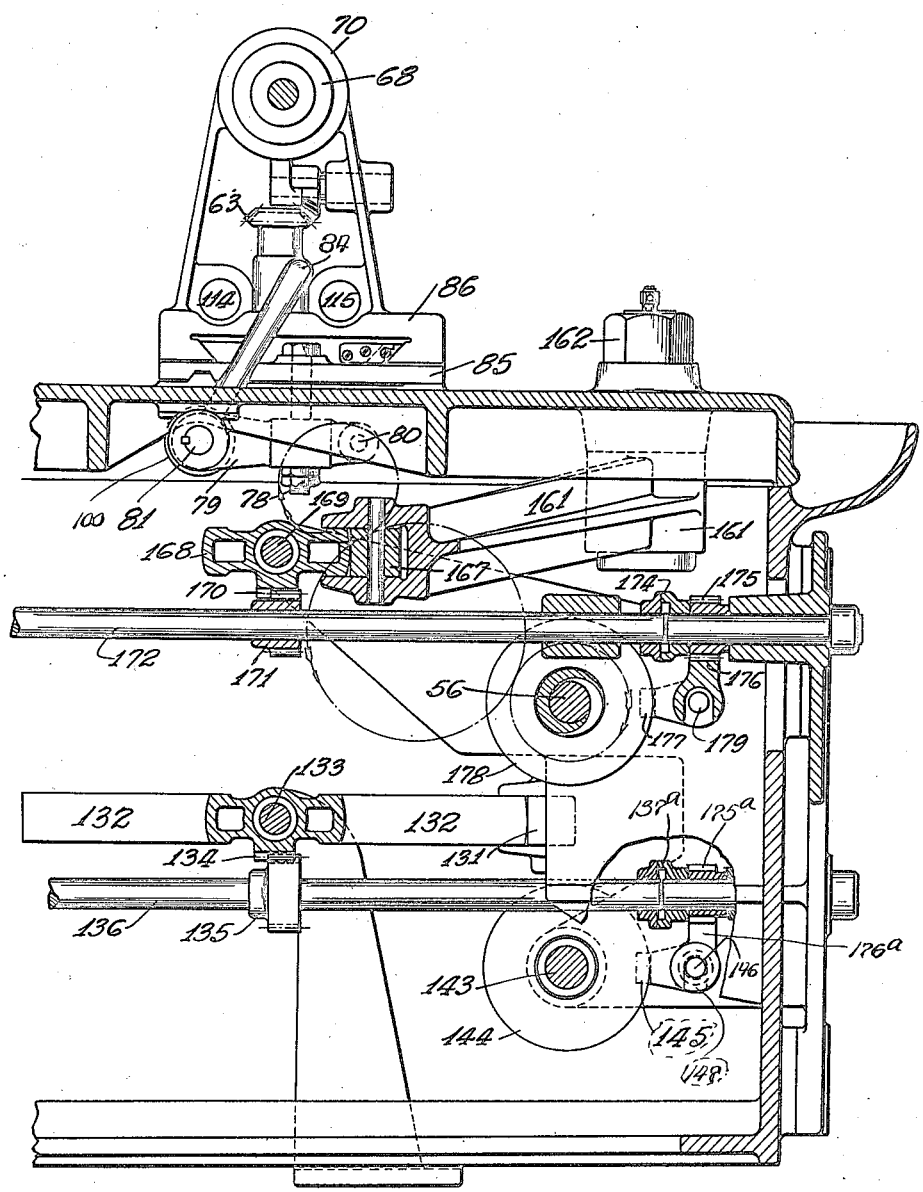
Figure 17:
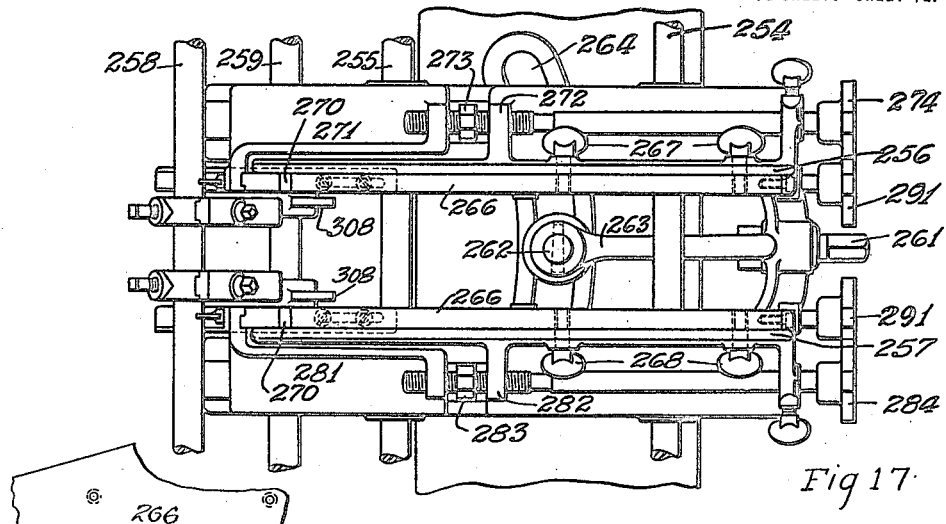
Figure 18:
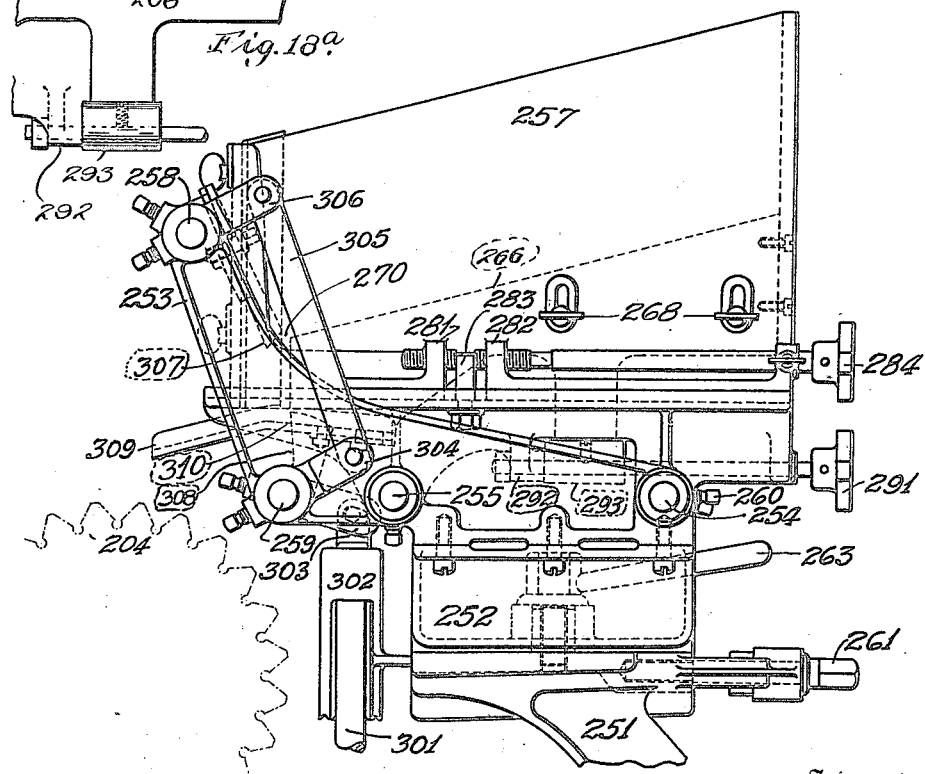

This invention relates to shaping machines and more particularly to machines for shaping the ends of bar stock either one or both ends at the same time and has for an object to save time and labor in work of this class and to adapt itself for shaping step bars of various diameters, also to bars of various lengths. This machine is entirely automatic in its operation, feeding, shaping and releasing bars each operation and is designed to obtain the highest degree of precision in this class of work. The objects of the machine are more particularly described in detail under the headings of the following specification and shown in the accompanying drawings in which Fig. 1 shows a side elevation of the machine complete, with certain parts sectioned. Fig. 2, is an end elevation in section, showing the main parts of the driving mechanism. Figs. 3, 4 and 5 show a variable speed driving mechanism used in connection with the operating cams. Figs. 6, 7 and 7$^a$ show a method of adjusting and positioning the feed heads of the operating spindles. Fig. 8 is a plan view of the bed plate of the machine with certain parts shown in section. Fig. 9, is an elevation in section showing certain details of the holding and feeding mechanism. Fig. 10, is a plan view taken with the bed plate removed, showing the operating levers controlling the feeding mechanism. Fig. 11 is an elevation in section showing certain details of the operating cams for the feeding mechanism. Fig. 12, is a plan view partly in section and Fig. 12$^a$, is a corresponding elevation showing the position of the feeding and holding mechanism for step bars. Figs. 13, 14 and 15 show the details partly in section of the indexing mechanism for the feeding and holding mechanism. Fig. 16, shows a front elevation of the feed hopper. Fig. 18, is a side elevation, Fig. 17, is a corresponding plan view showing the details of the feed hopper and Fig. 18$^a$ is a detail showing the method of adjusting the hopper.

The construction of this machine includes two oppositely disposed spindles and means for driving the same, means whereby the said spindles may be moved longitudinally while they are rotated, also means manually operated whereby they may be moved longitudinally at any time. Means for varying the longitudinal movement of these spindles relative to the number of revolutions made by them, means for positioning said spindles to perform exactly the same amount of work on bars of various lengths, means for feeding bars to be operated upon, means for automatically adjusting the machine to suit bars of various diameter following in succession, means for adjusting the machine to suit step bars having various diameters throughout their length, micrometer adjustments for setting the machine for accuracy, means for indexing and locking the feeding mechanism while a bar is being operated upon, means for feeding bars one at a time and a hopper mechanism adjustable for the various type of bars used in the machine.

*The tool spindles.*

This machine is provided with two oppositely disposed spindles usually driven in the opposite direction and geared by a train of bevel gearing with the driving unit of the machine. The details of the mechanism for this purpose will be understood by referring to Figs. 1 and 2. The frame of the machine is indicated by 11 and the bed plate by 12. 13 represents an electric motor for driving the entire machine and which may be operated at different speeds by suitable regulating devices. This motor by belt 14 drives the belt wheel 15 on shaft 16. This shaft has a bevel gear 17 engaging the bevel gear 18 on the vertical shaft 19 with the bevel gear 20 engaging bevel gear 21 on horizontal shaft 22 and which in turn by means of bevel gear 23 drives the inclined shaft 24 having the bevel gear 25 engaging bevel gear 26 splined on the spindle 27 in the drive head 28. Connected to the horizontal shaft 22 is a corresponding gear train arrangement (not shown) which drives the inclined shaft 29 Fig. 8, in the drive head 30 driving the spindle 31 similarly to spindle 27. The gears are so arranged as to drive this spindle in the opposite direction to spindle 27.

*Longitudinal movement of spindles.*

While the spindles 27 and 31 are rotated they are also moved toward each other at a speed which may be regulated relative to the rotary speed of the spindles themselves. This is secured by a friction drive best shown in Figs. 1, 2, 3, 4 and 5. On shaft 16 is splined the sleeve 33 carrying the friction wheel 32 and which may be moved by the fork 34 on the sliding member 35 arranged to slide on rod 45. This slide is provided with rack teeth 36 engaging the toothed quadrant 37 pivoted at 38 and moved with the beveled gear 39 which meshes with gear 40 operated by handle 41. This handle has an index pointer 43 moving over an index scale 42 and may be locked in position by the bolt 44. This index is graduated to show the feed of the spindles per revolution. Friction wheel 32 engages the friction disc 46 thereby rotating shaft 47 at a speed which is proportional to the distance friction wheel 32 is located from the centre of friction disc 46 and as determined by the movement of handle 41. Shaft 47 by bevel gears 48 and 49 drives shaft 50 carrying the worm 50ª engaging worm wheel 51 mounted to rotate with the main cam shaft 52. On this shaft is mounted the feed regulating cam 53 also spur gear 54 meshing with gear 55 on second cam shaft 56.

The cam 53 engages with plunger 57 which is held against the cam face by the spring 58. This plunger is provided with rack teeth 59, Fig. 2, engaging toothed wheel 60 mounted on horizontal shaft 61 and from this shaft the spindle feed is controlled.

The spindles pass through feed heads 69 and 70 as shown in Fig. 1. Each of these heads is provided with the vertical shaft 62 having a bevel gear 63 engaging a bevel quadrant 64 pivoted at 65 and carrying the toothed quadrant 66 engaging rack teeth on the sleeve 68 in each of the heads as best shown in Figs. 7 and 11. This vertical shaft in each head Figs. 1 and 6, is driven from helical gears 71 engaging corresponding gears 72 splined on shaft 61.

*Adjustment of spindle-feed head.*

The position of the feed heads is adjustable on the bed plate to accommodate bars of various length. The heads 69 and 70 are adjusted by a corresponding mechanism distinguished by similar reference characters on the drawings. These heads are arranged to slide on a guide on the bed plate and secured in position by the bolts 78 passing through the bed plate into the arms 79 pivoted at one end at 80, Fig. 6, the opposite end of which arms is drilled to receive shaft 81. This shaft is rotated by handles 84 Figs. 1 and 8, extending through the top of the bed plate. When either handle is turned in one direction it brings the corresponding cam 100 into engagement with the lower side of the bed plate 12, thereby applying tension to bolts 78 and securing the feed head to the base. When this handle is turned in the opposite direction, the cam 100 is released and the head may be moved in either direction to the extent of the slide on the base plate. In order to maintain the drive from the horizontal shaft 61 to the vertical shafts 62 the helical gears 72 are splined on shaft 61 and forks 74, extending from the heads carry gears 72 along the spline and in proper operative relation to gears 71. In addition to the slide on the base plate, rods 114 and 115 also assist in maintaining the alignment of the feed heads. These rods are secured in head 69 and slide through a close fitting sleeve in head 70, thus insuring perfect alignment of the spindles 27 and 31 while the handles 84 provide a quick and convenient means for adjusting the position of these heads.

*Automatic adjustment for variations in length of bars.*

One of the important features of this invention is that it will perform a machining operation to exactly the same extent on each end of bar stock even when this stock varies considerably in length. For instance, when used as a centering device, it is desirable in certain classes of work that the tool drill to exactly the same extent in each end of the bar, although the lengths of the bars fed into the machine may vary considerably in relation to each other. This is of considerable advantage when centering bars for taper reamers and similar articles where the taper is gauged from this operation.

This uniform operation is obtained by automatically moving the head 70 back a short distance from the location it has been positioned in and then moving it forward to a position gauged from the end of the bar to be operated upon. This is secured by a mechanism driven from the secondary cam shaft 56 through spur gear 98 engaging the long gear wheel 99 which in turn drives the idler 91, Fig. 1. This idler has a cam 90, Fig. 6, on its side which in turn engages a roller 89 secured to the bracket 88 which passes through an opening in the slide plate 85. This bracket is secured to slide 86 arranged to slide on plate 85 and forms the base of the feed head 70. Sleeve 87 supporting shaft 62 of this head engages the coil springs 93 and 94 and the opposite ends of these springs bear against the side of bracket 97 as shown in Fig. 1. Each time the idler wheel 91 is rotated the cam 90 engages the roller 89 and by means of the mechanism just described, moves the feed head 70 back in opposition to the action of springs 93 and 94 to the extent of the rise of this cam. Spur wheel 99 which drives the idler 81 is elongated as shown, in order to maintain this drive for any position to which the head 70 may be adjusted. When released from the cam this head is moved forward by the action of these springs until the offset arm 96, secured to the adjustable shaft 95 engages the end of the bar 101 to be operated upon. This forces this bar against the stop disc 97 at its opposite end and, when in this position, the spindles can be adjusted to feed to the same extent and to perform exactly the same operation on the ends of bar 101 without regard to its length. If this adjustable feature were not provided and a fixed longitudinal travel provided for the spindles 27 and 31, it is apparent that it would be impossible to perform an operation to exactly the same extent on each end of the bar.

*Manual adjustment for setting up.*

In machines of this character it is usual to provide manual means for affecting the various actions when adjusting the machine to any particular class of work. The manual operation of the cam shafts is made effective by means of the releasing handle 102 Fig. 8, secured to shaft 103 and moving the crank arm 104, Figs. 4, 5 and 8. When this crank arm is moved in one direction the clutch 105 is engaged and shaft 106 carrying the fork 107 moves the friction disc 46 against the action of spring 108 out of engagement with friction wheel 32, thus disconnecting the power drive to shaft 52 and placing the worm shaft 50 under control of chain wheel 109, which by chain 110 and chain wheel 111 operated by handle 112 enables the action of the cams hereinbefore described to be performed by manual operation while the spindle drive is maintained by the motor 13. When the adjustment is completed handle 102 is moved to the running position disconnecting clutch 105 and bringing friction disc 46 into engagement with friction wheel 32.

*Adjustment for step bars.*

This machine is suited for centering bars or shafts made in steps so that the diameter at one end may be greater than the diameter at the other end so that the centre will be accurately positioned in each end. In addition to this, bars of this character may vary slightly in diameter with relation to each other so that as they are automatically fed into the machine a new position of the holding mechanism may be required for each bar in order that it may be centered with absolute accuracy. These results are obtained by swivelling the holding mechanism on two pivots accurately spaced on each side of the bar arranged to turn through the arc of a circle so that the angular displacement on each side of the bar is exactly alike and this displacement may be varied to accommodate the various diameters of the shaft to be held. This is accomplished by the construction best shown in Figs. 1, 8, 9, 10, 11, and 12. The carriages 121 on each side of the spindles are pivoted on the shafts 125 and are free to move in the arc of a circle to a limited extent. Each carriage supports a shaft 123 in the sockets 122 upon which the feeding mechanism hereafter to be described is mounted. The shafts 125 are supported by brackets 126, Fig. 9, and at one side rigidly secured to the arm 128, and, at the opposite side, rigidly secured to arm 129, Fig. 10, with the result that as arms 128 and 129 are moved toward or away from each other shafts 125 are moved through the arc of a circle and shafts 123 on the carriages 121 are angularly displaced relatively to the drill spindle. The arms 128 and 129 are connected by a powerful spring 130 and are provided with rollers 131 in a fork which engages the inclined faces of large cam 132 sliding on rod 133 which is placed in a plane parallel with the operating spindles of the machine. The angular position of shafts 123 therefore depends upon the position of cam 132. When in the position shown in Fig. 10, which is the extreme position of the cam, the shafts are parallel as shown in Fig. 8. When the cam is moved to permit arms 128 and 129 to close, shafts 123 will assume a position corresponding to that shown in Fig. 12.

The position of cam 132 may be adjusted manually for setting up purposes. This cam is also operated to a limited extent to vary the angular displacement of shafts 123 each time the feeding mechanism of the machine operates to receive a new bar. The manual operation of this cam will be understood from Figs. 1, 10 and 11. The base of the cam is provided with rack teeth 134 engaging wheel 135 mounted on shaft 136, the opposite end of which is provided with a clutch mechanism 137, held in engagement by the spring 138. A latching device 139, Fig. 9, is provided on the end of shaft 136. When this device is withdrawn, the clutch 137 is disengaged and handle 140 may be rotated, thereby rotating wheel 135 and positioning cam 132. This operation is usually necessary when setting the machine to a new size of stock. After the proper adjustment has been made, the manual operation is discontinued by releasing the knob 139 to the position shown in Fig. 9, which permits clutch 137 to engage and places any further operation of cam 132 under the automatic control of the machine.

The secondary cam shaft 56 to which the spur gear 141 is secured drives the cam shaft 143 through the spur gear 142. On shaft 143, the face cam 144 best shown in Fig. 1 is mounted and engages roller 145, Fig. 11, on the shaft 146. The rise of this cam causes the shaft 146 to move back and compress spring 147. This shaft carries a rack 176ª engaging a gear 175ª on the end of shaft 136 and, when released by cam 144, moves back again to the starting position, thus providing a short reciprocating movement to cam 132, each time that a bar is fed into the feeding mechanism, thereby increasing slightly, the angular opening of the shafts 123. This enables the holding mechanism to provide a better grip on the bar stock as will hereafter be described while insuring a positive release. The cam 144 is positioned on shaft 143 against spring 148 so that if any obstruction should arise in the feeding mechanism, this cam will yield to the obstruction and relieve the mechanism from the strain.

Parallel adjustment of the feeding mechanism.

In addition to the angular adjustment just described, a parallel adjustment is provided in which the relative distance of each of the shafts 123 from the centre line of the spindles may be adjusted to exactly the same extent so as to position the feeding mechanism for bars of large or small diameter. This adjustment is combined with the angular adjustment so that the spacing of the shafts 123 from the centre line is adjusted for bars constructed in steps as well as bars of practically uniform diameter throughout. This adjustment is set manually and also automatically operated for each step of the feeding mechanism similar to the angular motion just described. As best shown in Figs. 8, 9, 10 and 11, the lever arm 161 is pivoted at 162 to the base and secured at 163 by a jaw connection to the carriage 121 and lever arm 164 is pivoted at 165 to the base and secured to the other carriage by a fork at 166. These lever arms are connected together by a powerful spring 181 and have rollers 167 placed in a fork which engages the cam 168 arranged to slide on rod 169 placed on the same vertical plane as the spindles of the machine. The lever arms 161 and 164 are exactly alike and pivoted at the same distance from the centre line; therefore, the movement of the cam 168 moves the ends of these levers 163 and 166 exactly to the same extent with relation to the centre line. The connections 163 and 166 to the brackets 126 supporting the pivot pins 125 of the carriages 121 have a micrometer adjustment as indicated at 182 so that the pivots of the carriages may be accurately positioned with relation to the centre line and locked in position by suitable set screws.

The cam 168 is manually adjusted by means of the rack teeth 170, Fig. 11, engaging gear 171 on shaft 172 which is provided with a spring 173 Fig. 10 holding clutch 174 in engagement with the operating mechanism 175, hereafter to be described. The outer end of shaft 172 is provided with an operating handle and releasing knob similar to shaft 136 so that clutch 174 may be disengaged and cam 168 manually positioned to suit the diameter of the work on which the machine is to be used. The spur wheel 175 is provided on the outer end of shaft 172 engaging the rack 176 sliding on shaft 179 and having a roller 177 engaging the face cam 178 mounted on shaft 56. When the rise on the face of cam 178 engages roller 177, shaft 172 is partially rotated in one direction moving the cam 168 with it and when roller 177 is released from cam 178 this motion is reversed by the action of spring 180, thus providing a reciprocating movement for cam 168 for each bar that is fed to the machine. This advances and retracts the holding mechanism which grips the bar stock as hereafter to be described.

The angular motion of the carriages 121 is limited in one direction by the stop screws 184 engaging the stop plates 185 secured to the bed plate. This stop screw is adjusted to engage when the shafts 123 are parallel as shown in Fig. 8.

The feeding mechanism.

The bar stock to be operated upon is fed into the mechanism by a plurality of opposed toothed wheels mounted upon shafts carried by the carriage so that these toothed wheels are subject to angular adjustment and adjustment relative to the centre line of the spindle. These wheels are arranged to grip the bar stock at right angle to its axis and for this purpose a novel constrution is adopted whereby these wheels always remain parallel to each other and at right angles to the spindles while the shaft upon which they are mounted may be angularly displaced to any extent; while in this position, means are provided for rotating these wheels to feed forward the stock to be operated upon. This part of my invention will be understood by referring to Figs. 1, 8, 9, 12 and 12ª. In Fig. 1, the bar stock is indicated by 101 as a plain, round bar of uniform diameter throughout. In Fig. 12, the mechanism is adjusted for a bar 201 having a larger diameter at one end than at the other and requiring an angular displacement in the feeding wheels. The feed wheels 202 mounted upon shaft 123 on one side of the centre line have a double row of spaced notches 204, and the feed wheels 203 positioned on bar 123 on the opposite side of the centre line have a single toothed wheel 205 having teeth corresponding to the shape of the teeth in wheels 202 and falling within the space between the teeth on wheels 202 thus forming a three-point support for the bar stock by each set of wheels. The teeth of these wheels overlap each other as indicated in Fig. 12ª, providing a positive grip to acurately position the bar stock and which is maintained by the springs controlling the pivot shafts 125. The position of these wheels on bars 123 is adjustable by the yoke 206 gripping each side of the feed wheels and having an extension 207 clamped on the aligning bar 114. This yoke has a wide, elongated opening in the centre as indicated in Figs. 9 and 12 and grips the feed wheels around the periphery, without interfering with the movement of shafts 123. A corresponding yoke 208 clamped to the aligning bar 115 by the clamp 209 is provided for the opposite toothed wheel. These wheels may therefore be positioned on bars 123 to suit stocks of various lengths.

The feed wheels are mounted upon shafts 123 with a novel type of ball and socket joint best shown in Figs. 12 and 12ª. This consists of a ball 211 splined on shafts 123 by the key 212 and fitting a socket on the feed wheels formed between members 216 and 217. This permits these wheels to remain parallel to each other as guided by the yokes 206 and 208 while the shafts 123 may be angularly disposed relative to each other. In order to transmit rotary motion from shaft 123 to the feed wheels a key way 215 is cut in these wheels and a key member 213 fitting the ball and having an engaging stem 214 ground to fit and rotate in key way 215, is provided as shown in Fig. 12. These wheels are therefore rotated while they are maintained parallel to each other and their axes may be angularly displaced by the rotation of the carriages 121 as indicated in Fig. 12, to provide for step bars of different diameters.

*Indexing mechanism.*

The indexing mechanism is operated in conjunction with the secondary cam shaft and arranged to rotate the feeding wheels one notch each time that the spindles are withdrawn and fed forward. This mechanism will be understood by referring to Figs. 13, 14 and 15, and consists of a ratchet feeding mechanism for moving forward the feed wheels together with a positive lock when the wheels are positioned, to guard against lost motion. This mechanism is operated by cam 221 on secondary cam shaft 56 engaging stem 223 sliding in sleeve 222 secured to the base 12. This plunger carries plate 224 formed to a radius about centre 125, Fig. 8, and is therefore in a position to engage plunger 225 while the latter which is secured to carriage 121 rotates about centre 125. Plunger 225 has a detent 226 engaging ratchet wheel 227 mounted on shaft 123 and moving this wheel forward one notch for each revolution of cam shaft 56. Plunger 225 is retracted by spring 228 shown in Fig. 15. An escapement 229 is provided on this plunger having a piece with an incline 230 on the upper side and an opposite incline 231 on the lower side falling in the plane of a pin 232 so that as plunger 225 is raised pin 232 is moved back carrying the lock pin 234 with it and releasing the indexing wheel 236 which is provided with a row of bushed holes 237 corresponding to each step of wheel 227. When plunger 225 returns to the normal position pin 232 engages the slope 231 of escapement 229, moving it on its pivot against spring 233, and by the action of spring 235, pin 234 locks wheel 236 in its new position.

It will be noted that for each revolution of the cam shafts, the spindles are moved forward to the operating position and moved back again. The feed wheels are moved forward one notch with a new bar of stock, and locked in position for another operation, also the feed wheels are automatically displaced angularly relative to the operating centre and are automatically spread parallel to each other.

*The feed hopper.*

The bar stock for feeding to the mechanism of this machine is placed in a hopper and automatically fed forward one bar at a time for each operation of the machine. This hopper is secured to the base of the machine and is adjustable to take bars of various length, adjustable to suit conditions arising from the use of step bars, adjustable with relation to the feed mechanism for bars of various diameters and adjustable with relation to the angular displacement of the feed wheels. This mechanism also includes a means whereby the bars cannot become jammed by crowding upon each other and in which only one bar is fed forward for each operation.

This part of the mechanism will be understood from Figs. 16, 17 and 18. The bracket 251 supporting the hopper is suitably secured to the base of the machine by bolts or other means not shown in the drawings. Upon this bracket the base casting 252 of the hopper is arranged to slide back and forth and may be positioned by the adjusting screw 261. This casting carries the brackets 253 on either side, supporting the rods 254 and 255 upon which the side plates 256 and 257 of the hopper are slidably mounted, thus providing adjustment to accommodate bars of various lengths. Shafts 258 and 259 are supported by brackets 253 and operate the mechanism of the hopper hereafter to be described. The side plates of the hopper may be locked in position on bar 254 by set screws 260 as indicated in Fig. 18.

In addition to sliding the mechanism back and forth by screw 261 this mechanism may also be swiveled by turning in the slot 264 which has a radius drawn from the centre line of the spindles. A handle 263 pivoted at 262 is used for locking the hopper when it has been adjusted angularly to suit the angular adjustment of the feeding mechanism.

Each side of the hopper is provided with inclined ways 266 arranged for the bar stock to roll into the feeding end. The height of these ways is adjustable on one side of the hopper by the thumb screws 267 engaging slotted openings in the side as shown, and on the other side by thumb screws 268. Thus the incline on one side may be adjusted higher or lower relative to the other side, thereby providing for bars of different diameters.

The bars are fed into the feeding mechanism through an opening 270 at the end of the inclined way. This opening is adjustable at each side so that it may be varied at one side independently of the other, to accommodate bars of various diameters. This adjustment is secured on the side 256 by the handle 274 having a shaft with a right and left hand thread positioned by the jaw 273, one thread of which engaged the outer section 271 and the other thread engages the inner section, carrying the inclined ways at 272. Turning handle 274 therefore increases or decreases the gap 270 on the side 256 and by a similar arrangement on side 257 handle 284 with the right and left threads positioned by the jaw 283 moves the outer section 281 and 282 relative to each other, thus increasing the gap 270 as may be desired to accommodate the diameter of the bar stock at this end fed to the hopper.

The cam 322, on the secondary cam shaft 56 engages plunger 323 which has the quadrant 321, Fig. 8, secured at its outer end. This quadrant passes under shaft 301 and raises the latter in guide 302 for each rise of the cam 322 in a manner similar to the indexing mechanism previously described. This shaft is connected to a crank arm 303 secured to shaft 259 having the arm 304 connected by the connecting rod 305 to arm 306 secured on shaft 258. The operation of cam shaft 56 therefore causes the corresponding oscillation of shafts 258 and 259. On shaft 258 is pivoted the shaker arms 307 which move forward over opening 270 and prevent the bars from jamming in this opening as might occur if they crowded upon each other.

The bars when they drop through the opening 270 fall upon the inclined way 309 leading to the toothed wheels 204. In order to prevent more than one bar from releasing at once an escapement is provided in the form of cams 308 moving under this opening and when moved back provide space for one bar only to drop out the ways 309. Owing to the reversed slope 310 on this way, this bar remains here until cams 308 are moved forward, pushing it over the incline unto ways 309 and at the same time bringing the cams under opening 270, thus preventing another bar from feeding forward until these cams are moved to the rear position again.

An adjustment is necessary between the base of opening 270 and the ways 309 on account of the various diameters of the bars and the use of step bars. This vertical adjustment is secured by raising the mechanism on each side above the ways 309 by means of shafts 291 having a bearing 292 operating an eccentric 293 arranged to elevate each side individually by engaging an extension from the inclined ways 266 as shown, in accordance with the adjustment required.

The oil pump.

The oil pump 352, usual in machines of this class, is driven by the belt pulley 351 from motor 13.

In the operation of this machine it will be observed that a quantity of bars are fed to the hopper which is adjusted to suit the size and diameters of these bars. Each operation of the secondary cam shaft releases one bar which is discharged onto the teeth of the feed wheels.

Each revolution of the cam shaft turns these wheels a distance corresponding to one tooth, bringing a new bar into position between the spindles. These wheels are at the same time slightly moved apart and also slightly rotated about the shaft 125 and allowed to close together again by a spring action applied equally from either side. They are thus positioned to grip the bar with absolute accuracy about the centre and to position this centre exactly in line with the spindles. A uniform grip is obtained for the bar between each pair of wheels, as these wheels are always maintained parallel and at right angles to the bar stock. A three-point grip, provided by this type of wheels provides a positive grip for the smallest as well as the largest bars.

One end of the bar is positioned against a stop located with relation to the end of the spindle. It is forced to this position by a preliminary movement provided in the opposite feed head which engages the opposite end of the bar and at the same time positions the opposite spindle relative to the end of the bar. These spindles are arranged to move back and forth towards the end of the bar at a speed that may be varied to suit the size of drill, this action being obtained from the secondary cam shaft and therefore in proper sequence with the other operations of the machine. When the work has been completed on the bars they are released from the holding wheels, as these wheels are turned and when they are spread apart and drop through a slot in the middle of the bed.

This machine will accurately and quickly centre shafts for drills, taps, taper reamers, armature shafts and similar articles without attention other than to supply the bar stock to the hopper.

Having thus described my invention, I claim:

1. A machine for shaping articles consisting of a rotating member, a holding device for blank stock to be operated upon by said member, said device consisting of rotating shafts at each side of the axial line of said rotating member capable of angular deflection relative to said member, opposed toothed wheels mounted on said shafts, said wheels supporting the blank stock in line with said rotating member.

2. A machine for shaping articles consisting of a horizontal rotating member, a holding device for blank stock to be operated upon by said member, said device consisting of rotating shafts at each side of the axial line of said rotating member, said shafts supported by carriers on vertical pivots, opposed wheels mounted on said shafts, said wheels supporting the blank stock in line with said rotating member.

3. A machine for shaping articles consisting of a rotating member, a holding device for blank stock to be operated upon by said member, said device consisting of rotating shafts at each side of the axial line of said rotating member, said shafts supported by carriers on vertical pivots at right angles to said rotating member, said pivots adjustably positioned and opposed wheels mounted on said shafts supporting the blank stock in line with said rotating member.

4. A machine for shaping articles consisting of a rotating member, a holding device for blank stock the ends of which are to be operated upon by said member, said device consisting of rotating shafts at each side of the axial line of said rotating member, said shafts supported by carriers on pivots at right angles to said rotating member, opposed wheels mounted on said shafts and means for moving said pivots in a plane at right angles to said rotating member upon each operation of said machine.

5. A machine for shaping articles consisting of a rotating member, a plurality of carriers on pivots at right angles to said rotating member supporting work, the end of which is operated upon by said member, means for adjusting the position of said pivots relative to said member and means for co-operatively moving said pivots in a plane at right angles to said rotating member upon each operation of said machine.

6. A machine for shaping articles consisting of a plurality of rotating spindles, each supported by a head stock on the same axial line, means for moving said spindles back and forth and automatic means for positioning said head stock relative to the end of work positioned between said spindles.

7. A machine for shaping articles consisting of a plurality of rotating spindles, each supported by a head stock on the same axial line, means for moving said spindles back and forth, an adjustable stop arm rigidly secured to said head stock engaging work positioned between said spindles and means for moving said head stock until arrested by said stop arm.

8. A machine for shaping articles consisting of a plurality of rotating spindles, each supported by a head stock on the same axial line, means for moving said spindles back and forth, means for automatically moving said head stock back for each operation of said machine and independent means for positioning said head stock relative to the end of work placed between said spindles.

9. A machine for shaping articles consisting of a plurality of rotating spindles each supported by head stock on the same axial line, means for positioning said head stocks to suit work placed between said spindles and means for automatically positioning one of said head stocks relative to the end of the work to be operated upon.

10. A machine for shaping articles consisting of a plurality of rotating spindles each supported by a head stock on the same axial line, a stop device positioning the work to be operated upon relative to one of said spindles and automatically operated means for positioning the opposite head stock relative to the other end of the work to be operated upon.

11. A machine for shaping articles consisting of a rotating spindle, a plurality of carriers supporting a holding mechanism, said mechanism comprising a pair of shafts at each side of the axial line of said rotating spindle supporting work placed in the line of said spindle, said carriers pivoted to rotate at right angles to said spindle and means for moving said carriers on their pivots.

12. A machine for shaping articles consisting of a rotating spindle, a plurality of carriers pivoted at right angles to said spindle, said carriers supporting a holding mechanism comprising a pair of shafts at each side of the axial line of said rotating spindle supporting work placed in the line of said spindle and means for automatically rotating said carriers on their pivots for each operation of said machine.

13. A machine for shaping articles consisting of a plurality of rotating spindles on the same axial line, a plurality of carriers pivoted at right angles to said spindles, said carriers supporting a holding mechanism comprising a pair of shafts supporting work placed between said spindles and means for angularly displacing said carriers on said pivots relative to said spindles.

14. A machine for shaping articles consisting of a plurality of rotating spindles on the same axial line, a carrier on each side of said axial line, supporting a holding mechanism comprising a pair of shafts supporting work between said spindles, said carriers pivoted at right angles to said spindles and means for partially rotating said carriers on said pivots.

15. A machine for shaping articles consisting of a rotating spindle, a pair of carriers, one on each side of the axial line of said spindle and pivoted at right angles to said spindle, said carriers supporting a holding mechanism comprising a pair of shafts supporting work of various sizes in line with said spindle and spring controlled means for moving said carriers to the same extent on their pivots.

16. A machine for shaping articles consisting of a plurality of rotating spindles, a pair of carriers on shafts parallel to the axis of said spindles, one on each side of the axial line of said spindles and pivoted at right angles to said spindles, supporting work of various sizes between said spindles, a positive means for deflecting said carriers to the same extent, on their pivots relative to said spindles and spring controlled means for moving said carriers in opposition to said positive means.

17. A machine for shaping articles consisting of a plurality of rotating spindles, a pair of carriers on shafts parallel to the axis of said spindles, one on each side of the axial line of said spindles and pivoted at right angles to said spindles, supporting work of various sizes between said spindles and means for cooperatively moving said carriers to the same extent on their pivots relative to said spindles.

18. A machine for shaping articles consisting of a plurality of rotating spindles, a plurality of carriers pivotally supported at right angles to said spindles supporting a holding mechanism comprising a pair of shafts supporting work of different diameters between said spindles and means for adjusting said carriers on said pivots to the character of the work to be supported.

19. A machine for shaping articles consisting of a plurality of rotating spindles, a plurality of carriers pivoted at right angles to said spindles and supporting work of different diameters between said spindles, means for adjusting said carriers on said pivots to the character of the work to be supported and means for making this adjustment individually for each operation of the machine.

20. A machine for shaping articles consisting of a plurality of rotating spindles on the same axial line, a plurality of carriers pivoted at right angles to said spindles supporting bars between said spindles, means for adjusting said carriers on said pivots to the contour of the bars to be supported and means for accurately positioning each bar in said line without regard to variations in the diameter of said bars.

21. A machine for shaping articles consisting of a plurality of rotating spindles, a plurality of carriers pivoted at right angles to said spindles supporting work between said spindles and a cam controlling the angular deflection of said carriers on their pivots.

22. A machine for shaping articles consisting of a plurality of rotating spindles, a plurality of carriers pivoted at right angles to said spindles supporting work between said spindles, a cam controlling the angular deflection of said carriers and means for manually adjusting the position of said cam.

23. A machine for shaping articles consisting of a plurality of rotating spindles, a plurality of carriers pivoted at an angle to said spindles supporting work between said spindles, a cam controlling the angular deflection of said carriers and automatic means for moving said cam for each operation of said machine.

24. A machine for shaping articles consisting of a plurality of rotating spindles, a plurality of carriers pivoted at an angle to said spindles supporting work between said spindles, a cam controlling the angular deflection of said carriers, said cam arranged to reciprocate on a plane parallel to the plane of said spindles.

25. A machine for shaping articles consisting of a plurality of rotating spindles, a plurality of carriers pivoted at right angles to said spindles supporting work between said spindles, means for moving said carriers on their pivots and means for moving said pivots in opposite directions relative to said spindles.

26. A machine for shaping articles consisting of a plurality of rotating spindles, a plurality of carriers pivoted at an angle to said spindles supporting work between said spindles, means for moving said carriers on their pivots and means for cooperatively moving said pivots in opposite directions and at right angles to said spindles.

27. A machine for shaping articles consisting of a rotating spindle, a plurality of carriers pivoted at an angle to said spindle supporting work in line with said spindle, means for imparting rotary motion on said pivots and linear motion toward and away from said spindle to said carriers for each operation of said machine.

28. A machine for shaping articles consisting of a rotating spindle, a plurality of carriers pivoted at an angle to said spindle supporting work in line with said spindle, means for imparting rotary motion on said pivots and linear motion toward and away from said spindle to each of said carriers to the same extent.

29. A machine for shaping articles consisting of a plurality of rotating spindles on the same axial line, a plurality of carriers pivoted at right angles to said spindles supporting work between said spindles, automatic means for moving said carriers on their pivots and for moving said pivots relative to said axial line in opposite directions for each operation of said machine.

30. A machine for shaping articles consisting of a plurality of rotating spindles, a plurality of carriers pivoted at right angles to said spindles, supporting work between said spindles, means for moving said carriers on their pivots and independent means for moving said pivots in opposite directions relative to said spindles.

31. A machine for shaping articles consisting of a rotating spindle, a plurality of carriers pivoted at right angles to said spindle, said carriers supporting a holding mechanism comprising a pair of shafts supporting work in line with said spindle, means for rotating said carriers on their pivots and spring controlled means for moving both of said pivots relative to said spindle.

32. A machine for shaping articles consisting of a plurality of rotating spindles, a plurality of carriers pivoted at an angle to said spindles, supporting work between said spindles, spring controlled means for moving said carriers on their pivots and spring controlled means for moving said pivots in opposite directions relative to said spindles.

33. A machine for shaping articles consisting of a plurality of rotating spindles, a plurality of carriers pivoted at an angle to said spindles supporting work between said spindles, said carriers equally spaced from said spindles, a cam for imparting a rotary motion to said carriers and a cam for simultaneously moving said pivots.

34. A machine for shaping articles consisting of a plurality of rotating spindles, a plurality of carriers supporting work between said spindles, said carriers equally spaced from said spindles and pivotally supported on arms, a cam engaging the opposite end of said arms said cam arranged to oscillate in a plane parallel with said spindles.

35. A machine for shaping articles consisting of a plurality of rotating spindles, a plurality of carriers supporting work between said spindles, said carriers equally spaced from said spindles, and rotatably supported on pivoted arms, a cam engaging the opposite end of said arms and means for moving said cam.

36. A machine for shaping articles consisting of a plurality of rotating spindles, a plurality of carriers supporting work between said spindles, said carriers equally spaced from said spindles and rotatably supported on pivoted arms, a cam engaging the opposite end of said arms, manual means for positioning said cam and means included in said machine for operating said cam.

37. A machine for shaping articles consisting of a plurality of rotating spindles, a carrier on each side of said spindles supporting work between said spindles, said carriers mounted for oscillatory and reciprocating movement at right angles to said spindles and means for imparting said motion to said carriers for each operation of said machine.

38. A machine for shaping articles consisting of a plurality of rotating spindles, a carrier on each side of said spindles supporting work between said spindles, said carrier mounted for oscillatory and reciprocating movement at right angles to said spindles, cams operated by said machine for effecting the movements of said carriers, said rotary and reciprocating movements being coordinated with relation to the work to be supported.

39. A machine for shaping articles consisting of a spindle, a carrying and holding device for work located in the plane of said spindle, said device consisting of a pair of opposed toothed wheels in different planes arranged so that the circumference of one overlaps the circumference of the other and carries the work between them.

40. A machine for shaping articles consisting of a spindle, a carrying and holding device for work located in the plane of said spindle, said device consisting of a plurality of shafts with toothed wheels on each shaft in staggered relation to similar wheels on the other shaft, said wheels arranged to grip the work at intervals.

41. A machine for shaping articles consisting of a spindle, a pivoted carrying and a rotary holding device for work located in the plane of said spindle, said device comprising a plurality of opposed wheels and means including said carrier, for deflecting the axis of said wheels relative to said spindle to grip work varying in size.

42. A machine for shaping articles consisting of a spindle, a carrying and holding device for work located in the plane of said spindle, said device consisting of opposed wheels, means for deflecting the axis of said wheels in opposite directions and means for maintaining said opposed wheels parallel to each other.

43. A machine for shaping articles consisting of a spindle, a carrying and holding device for work located in the plane of said spindle, said device consisting of opposed wheels, means for deflecting the axis of said wheels relative to said spindle, means for rotating said wheels and means for maintaining them parallel to each other.

44. A machine for shaping articles consisting of a spindle, a carrying and holding device for work located in the plane of said spindle, said device consisting of opposed wheels, said wheels each mounted on ball and socket bearings, means for rotating said wheels and means for maintaining said wheels parallel to each other.

45. A machine for shaping articles consisting of a spindle, a carrying and holding device for work located in the plane of said spindle, said device consisting of opposed wheels, said wheels each mounted on ball and socket bearings, means for deflecting said bearings and means for maintaining said wheels parallel to each other.

46. A machine for shaping articles including a rotating spindle, a mechanism angularly displaced relative to said spindle for feeding and supporting blank stock of varying diameters to be operated upon, a horizontal hopper for receiving and delivering blank stock to said feeding mechanism, said hopper being mounted for partial rotation to align with said mechanism according to the character of the stock.

47. A machine for shaping articles consisting of a rotating spindle, a mechanism for feeding and supporting blank stock to be operated on by said spindle, a hopper for receiving and delivering blank stock to said mechanism, said hopper having a pair of inclined ways for supporting the blank stock and independent means for adjusting the height of each of said ways.

48. A machine for shaping articles consisting of a rotating member, a holding device for blank stock to be operated upon by said member, said device consisting of two non-parallel rotating shafts, opposed wheels mounted on said shafts and a fixed guide holding said wheels parallel to each other.

Signed at New York city in the county of New York and State of New York, this 21st day of July, A. D. 1920.

EDMUND R. BARANY.